US012810791B2

(12) United States Patent
Wang et al.

(10) Patent No.: US 12,810,791 B2
(45) Date of Patent: Nov. 24, 2026

(54) DISPLAY DEVICE AND DISPLAY METHOD

(71) Applicants: Chengdu BOE Optoelectronics Technology Co., Ltd., Chengdu (CN); BOE Technology Group Co., Ltd., Beijing (CN)

(72) Inventors: Mingqiang Wang, Beijing (CN); Xueying He, Beijing (CN); Yuren Zhang, Beijing (CN); Yunqiao Zhang, Beijing (CN); Lian Xiang, Beijing (CN); Jiaxiang Zhang, Beijing (CN); Gong Chen, Beijing (CN); Bin Zhang, Beijing (CN); Jianbo Xian, Beijing (CN); Yi Zhang, Beijing (CN); Peng Yang, Beijing (CN)

(73) Assignees: Chengdu BOE Optoelectronics Technology Co., Ltd., Chengdu (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 19/150,062

(22) PCT Filed: Jul. 29, 2024

(86) PCT No.: PCT/CN2024/108190

§ 371 (c)(1),
(2) Date: Jul. 22, 2025

(87) PCT Pub. No.: WO2026/025224

PCT Pub. Date: Feb. 5, 2026

(65) Prior Publication Data

US 2026/0148689 A1 May 28, 2026

(51) Int. Cl.
*G09G 3/3225* (2016.01)

(52) U.S. Cl.
CPC ....... *G09G 3/3225* (2013.01); *G09G 2310/08* (2013.01); *G09G 2330/023* (2013.01)

(58) Field of Classification Search
CPC ............. G09G 3/3225; G09G 2310/08; G09G 2330/023
See application file for complete search history.

(56) References Cited

U.S. PATENT DOCUMENTS

2016/0109934 A1* 4/2016 Woo ..................... G06F 1/3265 345/211
2017/0116927 A1* 4/2017 Bae ......................... G06F 9/451
(Continued)

FOREIGN PATENT DOCUMENTS

CN 108319360 A 7/2018
CN 113593463 A 11/2021
(Continued)

*Primary Examiner* — Premal R Patel
(74) *Attorney, Agent, or Firm* — Westman, Champlin & Koehler, P.A.

(57) ABSTRACT

A display device and a display method are provided. The display device includes: a driving circuit; a first control circuit configured to, in response to a selection signal from the driving circuit being at a first level, send a first data signal to the driving circuit via the first data line so that the driving circuit drives the display panel to display in a first display mode; and a second control circuit configured to, in response to the selection signal being at a second level, send a second data signal to the driving circuit via the second data line so that the driving circuit drives the display panel to display in a second display mode. A display power of the display panel in the first display mode is greater than that in the second display mode.

19 Claims, 11 Drawing Sheets

(56) References Cited

U.S. PATENT DOCUMENTS

| | | | | |
|---|---|---|---|---|
| 2019/0237007 | A1 | 8/2019 | Cao et al. | |
| 2025/0372016 | A1* | 12/2025 | Back | G09G 3/20 |

FOREIGN PATENT DOCUMENTS

| | | | |
|---|---|---|---|
| CN | 114299845 | A | 4/2022 |
| JP | 2012063790 | A | 3/2012 |

* cited by examiner

DISPLAY DEVICE AND DISPLAY METHOD

CROSS REFERENCE TO RELATED APPLICATION(S)

This application is a Section 371 National Stage Application of International Application No. PCT/CN2024/108190, filed on Jul. 29, 2024, entitled "DISPLAY DEVICE AND DISPLAY METHOD", which is incorporated herein by reference in its entirety.

TECHNICAL FIELD

The present disclosure relates to a field of display technology, and in particular to a display device and a display method.

BACKGROUND

Some display products typically use a single host to control multiple functional modules. For example, a smart watch has only one host and one interface, and the host sends commands and data through the interface to achieve an overall control of the smart watch. However, this results in a high power consumption and a short standby time for the display product.

SUMMARY

The present disclosure provides a display device and a display method.

According to a first aspect, the present disclosure provides a display device, including: a display panel; a driving circuit; a first control circuit electrically connected to the driving circuit via a first data line, where the first control circuit is configured to, in response to a selection signal from the driving circuit being at a first level, send a first data signal to the driving circuit via the first data line so that the driving circuit drives the display panel to display in a first display mode; and a second control circuit electrically connected to the driving circuit via a second data line, where the second control circuit is configured to, in response to the selection signal being at a second level, send a second data signal to the driving circuit via the second data line so that the driving circuit drives the display panel to display in a second display mode; where a transmission power of the first data line for transmitting the first data signal is greater than a transmission power of the second data line for transmitting the second data signal, and a display power of the display panel in the first display mode is greater than a display power of the display panel in the second display mode.

According to a second aspect, the present disclosure provides a display method applied to the display device provided in embodiments of the present disclosure. The display method including: in response to a selection signal being at a first level, controlling the first control circuit to send a first data signal to the display panel via the first data line so as to drive the display panel to display in a first display mode; and in response to the selection signal being at a second level, controlling the second control circuit to send a second data signal to the display panel via the second data line so as to drive the display panel to display in a second display mode.

DETAILED DESCRIPTION OF EMBODIMENTS

To make objectives, technical solutions and advantages of embodiments of the present disclosure clearer, technical solutions in embodiments of the present disclosure will be clearly and completely described below with reference to the accompanying drawings in embodiments of the present disclosure. Obviously, the described embodiments are some, but not all, of embodiments of the present disclosure. All additional embodiments obtained by those ordinary skilled in the art without inventive efforts based on the described embodiments of the present disclosure fall within the protection scope of the present disclosure. In the following description, some specific embodiments are only for illustrative purposes and should not be construed as any limitation to the present disclosure, but are merely examples of embodiments of the present disclosure. Conventional structures or constructions may be omitted when they may cause confusion in understanding the present disclosure. It should be noted that the shapes and sizes of components in the accompanying drawings do not reflect actual sizes and proportions, but merely illustrate the contents of embodiments of the present disclosure.

Unless otherwise defined, technical or scientific terms used in embodiments of the present disclosure should have the ordinary meanings as understood by those skilled in the art. The terms "first", "second" and similar words used in embodiments of the present disclosure do not indicate any order, quantity or importance, but are only used to distinguish different components.

Furthermore, in the description of embodiments of the present disclosure, the term "connected to" or "interconnected" may mean that two components are directly connected, or that two components are connected through one or more other components, and the connection may be electrical connection or electrical coupling. In addition, the two components may be connected or coupled in a wired or wireless manner.

Figure 1:
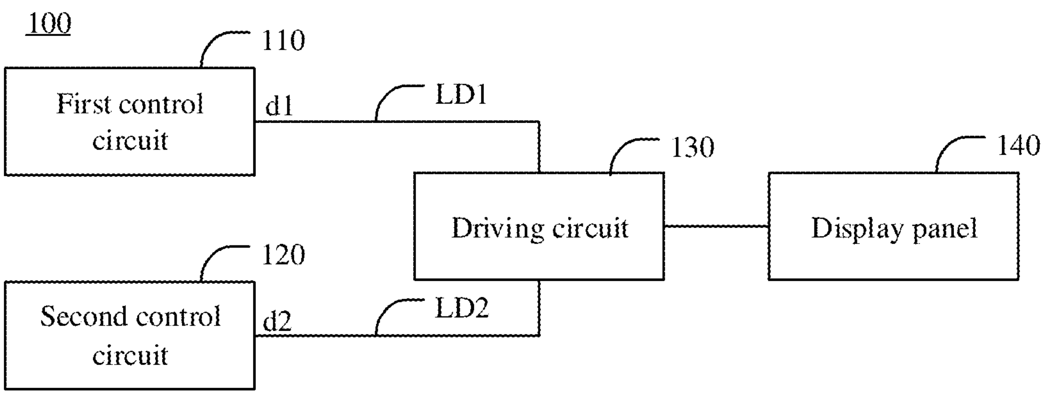
FIG. 1 shows a schematic structural diagram of a display device according to an embodiment of the present disclosure.

FIG. 1 shows a schematic structural diagram of a display device according to an embodiment of the present disclosure.

As shown in FIG. 1, a display device 100 includes a first control circuit 110, a second control circuit 120, a driving circuit 130, and a display panel 140.

In embodiments of the present disclosure, the display panel 140 includes a plurality of light-emitting elements. The display panel 140 may display images after the light-emitting elements are activated to emit light. For example, the display panel may be an Active Matrix/Organic Light Emitting Diode (AMOLED) panel, and the light-emitting elements may be OLEDs.

In embodiments of the present disclosure, the driving circuit 130 may be a Display Driver Integrated Circuit (DDIC), and the driving circuit 130 may send data signals and scan signals to the display panel 140 so that the display panel 140 may display content. The driving circuit 110 may also be a Touch and Display Driver Integration Circuit (TDDIC), and the driving circuit 130 may send data circuit signals and scan signals to the display panel 140 based on received touch signals indicating touch commands, so that the display panel 140 displays content based on the touch commands.

For example, the display panel 140 may include a display region and a non-display region. The light-emitting elements are provided in the display region, and the driving circuit 130 may be provided in the non-display region of the display panel 140.

In embodiments of the present disclosure, the first control circuit 110 is electrically connected to the driving circuit 130 via a first data line LD1. In response to a selection signal from the driving circuit 130 being at a first level, the first control circuit 110 may send a first data signal d1 to the driving circuit 130 via the first data line LD1, so that the driving circuit 130 drives the display panel 140 to display in a first display mode.

In embodiments of the present disclosure, the second control circuit 120 is electrically connected to the driving circuit 130 via a second data line LD2. In response to the selection signal from the driving circuit 130 being at a second level, the second control circuit 120 may send a second data signal d2 to the driving circuit 130 via the second data line LD2, so that the driving circuit 130 drives the display panel 140 to display in a second display mode.

In embodiments of the present disclosure, the selection signal may indicate whether the first data line LD1 or the second data line LD2 transmits data signals. For example, in response to the level of the selection signal, the first control circuit 110 and the second control circuit 120 may send data signals to the driving circuit 130 respectively via the first data line LD1 and the second data line LD2, so as to drive the display panel 140 to display in the corresponding display mode.

For example, the first level is a low level, and the second level is a high level. In response to the selection signal being at a low level, the first control circuit 110 may send the first data signal d1 to the driving circuit 130 via the first data line LD1, so that the driving circuit 130 drives the display panel 140 to display in the first display mode. In response to the selection signal being at a high level, the second control circuit 120 may send the second data signal d2 to the driving circuit 130 via the second data line LD2, so that the driving circuit 130 drives the display panel 140 to display in the second display mode.

For example, the first display mode may be a Normal Brightness Monitor (NBM) mode. During the use of the display device, it is possible to display complex images in the NBM mode. For example, when an information is being browsed by a user through the display device, the display device may be set to operate in the NBM mode.

In the NBM mode, all functional components of the display device 100 may be in active state. For example, if the display device 100 has light-emitting elements and a wireless communicator, the first control circuit 110 may control the wireless communicator to receive a target image and send an image data signal, a control signal and signal timing that represent the target image to the driving circuit 130, so that the driving circuit 130 may send a data voltage signal and a scan signal to the display panel 140, thereby driving the light-emitting elements in the display panel 140 to emit light to display the target image.

For example, the second display mode may be an Always On Display (AOD) mode. When the display panel 140 is in a standby state, it is possible to display a simple image in the AOD mode. For example, when the display panel 140 is not being used by the user, the display panel 140 may only display a simple wallpaper image or a static image. For example, the display panel 140 may only display a clock image, and a background of the clock image may be a solid color. For example, a digital dial or an analog dial may be displayed on a solid color background. In the AOD mode, the display attributes of the display panel 140

In the AOD mode, functional components of the display device 100 other than those used to drive the light-emitting elements to emit light may all be in a sleep state. For example, if the display device 100 has light-emitting elements and a wireless communicator, the second control circuit 120 may only send an image data signal, a control signal and signal timing that represent a digital dial image to the driving circuit 130, so that the driving circuit 130 may send a data voltage signal and a scan signal to the display panel 140, thereby driving the light-emitting elements in the display panel 140 to emit light to display the digital dial image.

In embodiments of the present disclosure, the first data signal d1 is used to transmit a data voltage signal from the first control circuit 110 to the driving circuit 130. The first data signal d1 indicates image data required to be displayed on the display panel 140 in the first display mode. For example, the first data signal d1 may be image data output by the first control circuit 110 based on a display command in the first display mode, or may be image data generated by the first control circuit 110 based on touch data in the first display mode. The first data signal d1 may represent a pixel value of each pixel in the image data. In the first display mode, the driving circuit 130 may output a scan signal and a data voltage signal to the display panel 140 in response to receiving the first data signal d1 from the first control circuit 110.

In embodiments of the present disclosure, a transmission power of the first data line LD1 for transmitting the first data signal d1 is greater than a transmission power of the second data line LD2 for transmitting the second data signal d2.

For example, a workload of the first control circuit 110 in the first display mode is greater than a workload of the second control circuit 120 in the second display mode, and an amount of data required to be displayed on the display panel 140 in the first display mode is greater than an amount of data required to be displayed on the display panel in the second display mode. Therefore, in a unit time, the amount of data transmitted by the first data line LD1 is greater than the amount of data transmitted by the second data line LD2, and the transmission power consumption of the first data line LD1 for transmitting the first data signal d1 is greater than the transmission power consumption of the second data line LD2 for transmitting the second data signal d2.

In embodiments of the present disclosure, a display power of the display panel 140 in the first display mode is greater than a display power of the display panel 140 in the second display mode.

For example, the light-emitting elements in the display panel 140 may be sub-pixels, and the number of sub-pixels that are activated to emit light in the display panel 140 in the first display mode is greater than that in the second display mode. A duration for which the sub-pixels are activated to emit light in the display panel 140 in the first display mode is longer than that in the second display mode.

In embodiments of the present disclosure, the first control circuit 110 may be a System on Chips (SoC), and the second control circuit 120 may be a Microcontroller Unit (MCU). An operating frequency and a size of the second control circuit 120 are both smaller than those of the first control circuit 110. A power consumption generated during the operation of the first control circuit 110 is greater than that generated during the operation of the second control circuit 120.

In embodiments of the present disclosure, display processes of the display panel 140 in the two display modes are respectively controlled through two control circuits and two data lines. The first control circuit 110 controls the driving circuit 130 to provide a normal driving power required by the display panel 140 in the first display mode, while the second control circuit 120 controls the driving circuit 130 to provide a reduced driving power required by the display panel 140 in the second display mode, so that an overall power consumption of the display device in the second display mode may be reduced, and the standby time of the display device 100 may be extended.

A control principle of the first control circuit and the second control circuit provided by the present disclosure will be illustratively described with reference to FIG. 2.

Figure 2:
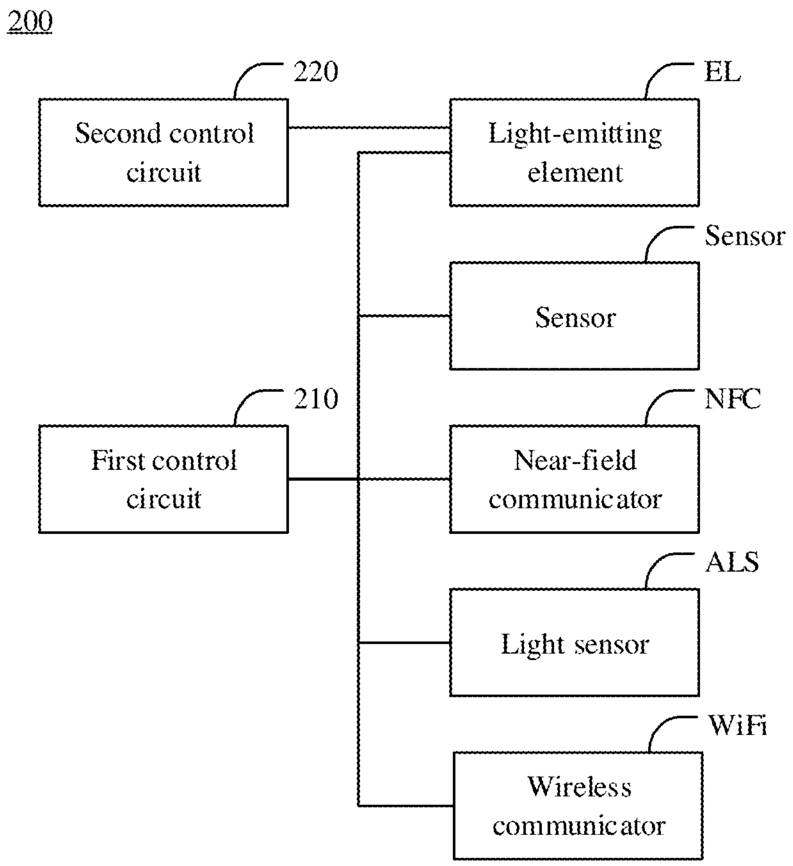
FIG. 2 shows a schematic diagram of a principle of a first control circuit and a second control circuit according to an embodiment of the present disclosure.

FIG. 2 shows a schematic diagram of a principle of the first control circuit and the second control circuit according to an embodiment of the present disclosure.

As shown in FIG. 2, a display device 200 includes a first control circuit 210, a second control circuit 220, a light-emitting element EL, a sensor Sensor, a near-field communicator NFC, a light sensor ALS, and a wireless communicator WiFi. The light-emitting element EL, the sensor Sensor, the near-field communicator NFC, the light sensor ALS and the wireless communicator WiFi may be functional components in the display device 200 to perform various functions of the display device 200.

It should be noted that FIG. 2 merely schematically shows a control method of the first control circuit 210 and the second control circuit 220 over various functional components in the display device 200, and does not limit connection relationships between the first control circuit 210/the second control circuit 220 and the functional components.

In embodiments of the present disclosure, the first control circuit 210 may control the light-emitting element EL, the sensor Sensor, the near-field communicator NFC, the light sensor ALS and the wireless communicator WiFi, while the second control circuit 220 only controls the light-emitting element EL.

The first control circuit 210 may directly control the functional components, or indirectly control the functional components through other components. For example, the first control circuit 210 may directly control the near-field communicator NFC, including enabling or disabling the near-field communicator NFC, receiving an information from the near-field communicator NFC, and sending an information to the near-field communicator NFC so that the near-field communicator NFC may transmit the information from the first control circuit 210 outward. For example, it is also possible for the first control circuit 210 to indirectly control the light-emitting element EL through a driving circuit (for example, the driving circuit 130 shown in FIG. 1). The first control circuit 210 may send a first data signal and a timing control signal to the driving circuit, and the driving circuit may generate a scan signal and a data voltage information based on the first data signal and the timing control signal, so as to drive the light-emitting element EL to emit light.

In embodiments of the present disclosure, in the first display mode, the light-emitting element EL, the sensor Sensor, the near-field communicator NFC, the light sensor ALS and the wireless communicator WiFi are all in active state. The first control circuit 210 may control the light-emitting element EL, the sensor Sensor, the near-field communicator NFC, the light sensor ALS and the wireless communicator WiFi to operate. The first control circuit 110 may control a plurality of functional components, so that the plurality of functional components may cooperate to meet various display requirements in the first display mode.

In embodiments of the present disclosure, in the second display mode, the light-emitting element EL is in an active state, while the sensor Sensor, the near-field communicator NFC, the light sensor ALS and the wireless communicator WiFi are all in a sleep state. The second control circuit 220 may only control the light-emitting element EL. In the second display mode, the second control circuit 220 is not capable of waking up the sensor Sensor, the near-field communicator NFC, the light sensor ALS and the wireless communicator WiFi, so that functional components other than the light-emitting elements EL remain in a low-power state.

Since only the light-emitting element EL needs to be controlled in the second display mode, the light-emitting element EL may be controlled by the second control circuit 220, which has a lower operating power consumption than the first control circuit 210, so as to reduce the operating power consumption of the display device 200 in the second display mode.

In embodiments of the present disclosure, by separately controlling different functional components in the display device 200 using two control circuits as two hosts, the operating power consumption of the display device may be reduced, and the standby time of the display device 200 may be extended. In addition, by controlling the two display modes of the display panel separately using two control circuits, it is possible to achieve a precise control over different display modes of the display panel, thereby reducing the overall operating power consumption of the display device 200.

Figure 3A:
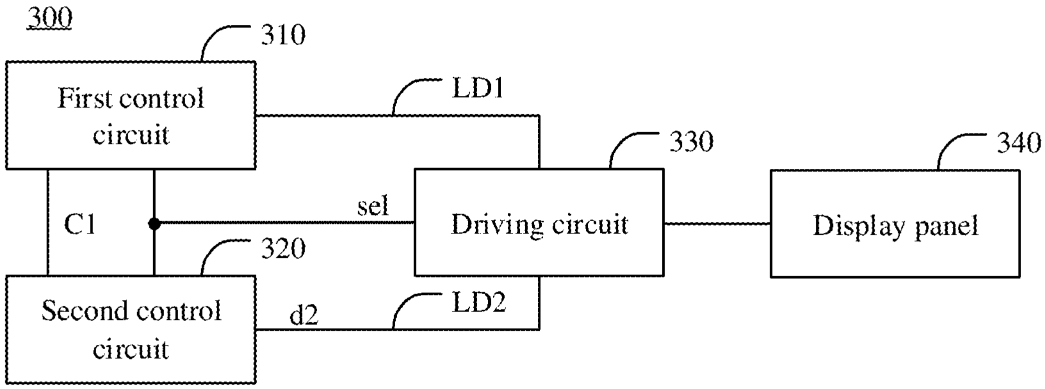
FIG. 3A shows a schematic structural diagram of a display device according to another embodiment of the present disclosure.

FIG. 3A shows a schematic structural diagram of a display device according to another embodiment of the present disclosure.

As shown in FIG. 3A, a display device 300 includes a first control circuit 310, a second control circuit 320, a driving circuit 330, and a display panel 340.

In embodiments of the present disclosure, for the first control circuit 310, the second control circuit 320, the driving circuit 330 and the display panel 340, reference may be made to the first control circuit 110, the second control circuit 120, the driving circuit 130 and the display panel 140 described above. For conciseness, similar parts will not be repeated here.

In embodiments of the present disclosure, the first control circuit 310 may send a first switching command C1 to the second control circuit 320 and control the first data line LD1 to switch from a first transmission mode to a second transmission mode, where the first switching command C1 indicates a switch from the first display mode to the second display mode. In response to the first switching command, the second control circuit 320 may switch a selection signal sel from a first level to a second level and control the second data line LD2 to switch from the second transmission mode to the first transmission mode.

In embodiments of the present disclosure, the display panel 340 is currently controlled by the first control circuit 310 and operating in the first display mode. When the display panel switches from the first display mode to the second display mode, the first control circuit 310 sends the first switching command C1 to the second control circuit 320, indicating that the second control circuit 320 controls the display panel 340 to display in the second display mode.

For example, the first control circuit 310 may directly send the first switching command C1 to the second control circuit 320, or the first control circuit 310 may write the first switching command C1 into a register and the second control circuit 320 may read the first switching command C1 from the register.

In embodiments of the present disclosure, the first data line LD1 and the second data line LD2 may support various transmission protocols and transmit data in different transmission modes. A transmission power in the first transmission mode is greater than that in the second transmission mode. For example, the first transmission mode may be a High Speed (HS) transmission mode, and the second transmission mode may be a Low Power (LP) transmission mode.

After the display panel 340 switches from the first display mode to the second display mode, the first control circuit 310 and the first data line LD1 may not participate in data transmission or may perform minimal data transmission. Therefore, the first control circuit 310 may switch the first data line LD1 from the HS transmission mode to the LP mode, thereby reducing the transmission power consumption generated by the first data line LD1 in the second display mode. For example, the second transmission mode may be an LP11 transmission mode in the LP mode.

For example, the first control circuit 310 may also switch the first data line LD1 from the HS transmission mode to an Ultra-Low Power State (ULPS) transmission mode. When the first data line LD1 is in the ULPS mode, the first data line LD1 is in a floating state and does not transmit data signals.

After the display panel 340 switches from the first display mode to the second display mode, the second control circuit 320 and the second data line LD2 participate in data transmission. Therefore, the second control circuit 320 may switch the second data line LD2 from the LP transmission mode to the HS mode to improve a transmission efficiency of the second data line LD2.

For example, the second data line LD2 may be in the ULPS mode before the display panel 340 switches from the first display mode to the second display mode. The second control circuit 320 may switch the second data line LD2 from the ULPS transmission mode to the HS mode.

In embodiments of the present disclosure, the selection signal indicates whether the first data line LD1 or the second data line LD2 transmits data signals. The data signals are transmitted via different data lines in different display modes. Therefore, in response to the level of the selection signal sel, it is possible to control whether to switch the transmission state of the data line, so as to transmit data signals via the data line corresponding to the display mode.

Figure 3B:
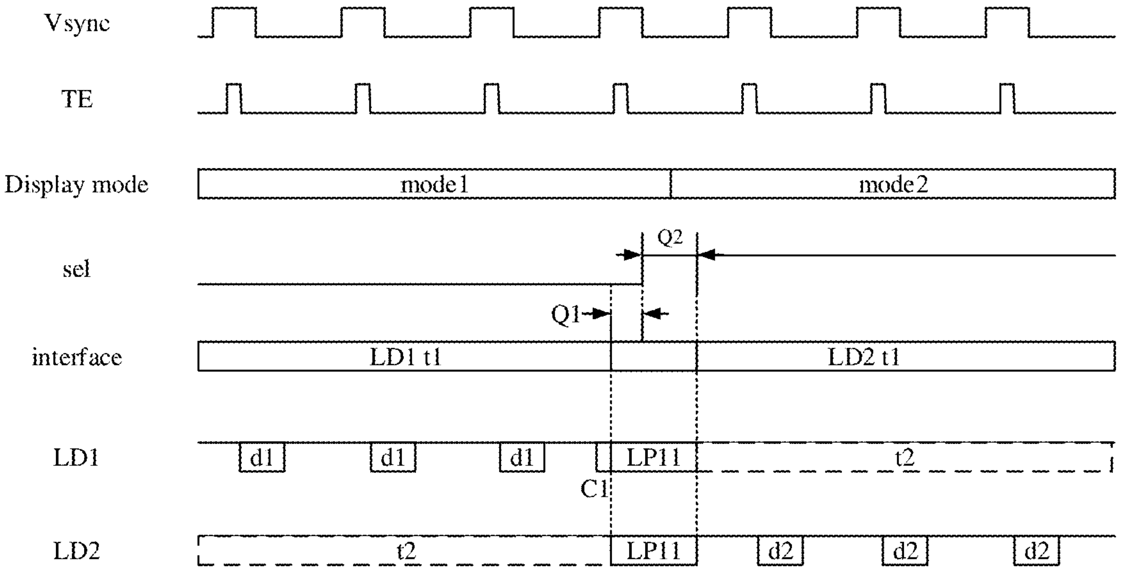
FIG. 3B shows a schematic timing diagram of signals according to an embodiment of the present disclosure.

FIG. 3B shows a schematic timing diagram of signals according to an embodiment of the present disclosure. A process of switching the display panel from the first display mode to the second display mode will be schematically described with reference to FIG. 3A and FIG. 3B.

The first display mode mode1 may be the NBM mode, and the second display mode mode2 may be the AOD mode. The first transmission mode t1 may be the HS mode, and the second transmission mode t2 may be the LP11 mode or the ULPS mode. The selection signal sel indicates whether the first data line LD1 or the second data line LD2 transmits data signals. For example, a low level of the selection signal sel indicates that the first data line LD1 is in the first transmission mode t1 and the first data line LD1 may transmit data signals. A high level of the selection signal sel indicates that the second data line LD2 is in the first transmission mode t1 and the second data line LD2 may transmit data signals.

It should be noted that the first data line LD1 may enter the LP11 mode after the first control circuit 310 sends the first switching command C1. At this time, the first control circuit 310, the second control circuit 320 and the driving circuit 330 may determine that the first data line LD1 enters the LP11 mode in response to the first switching command C1, rather than determining that the first data line LD1 is in the first transmission mode t1 based on the low level of the selection signal sel.

It may be understood that the first switching command C1 has a higher priority than the level of the selection signal sel. For example, in the first display mode, it may be determined, based only on the low level of the selection signal sel, that the first data line LD1 transmits the first data signal d1. After the first control circuit 310 sends the first switching command C1, the transmission mode of the first data line LD1 is preferentially determined based on the first switching command C1. In addition, when it is determined based on the first switching command C1 that the transmission mode of the first data line LD1 is the LP11 mode, the second control circuit 320 may switch the selection signal sel from a low level to a high level after a first duration Q1 has elapsed.

After the selection signal sel has switched from a low level to a high level, the second data line LD1 is still currently in the LP11 mode. At this time, the first control circuit 310, the second control circuit 320 and the driving circuit 330 may determine that the first data line LD1 enters the LP11 mode in response to the switch of the selection signal sel from the low level to the high level, rather than determining that the second data line LD2 is in the first transmission mode t1 based on the high level of the selection signal sel. After a second duration Q2 has elapsed, the first control circuit 310, the second control circuit 320 and the driving circuit 330 may determine that the second data line LD2 is in the first transmission mode t1 in response to the high level of the selection signal sel.

A data line information interface may indicate the data line currently in the first transmission mode t1, that is, indicate whether the driving circuit 330 is currently receiving data signals via the first data line LD1 or the second data line LD2. For example, in the first display mode, before the first control circuit 310 completes sending the first switching command C1, the driving circuit 330 may determine that the first data line LD1 is in the first transmission mode t1 based on the low level of the selection signal sel and may receive the first data signal d1 via the first data line LD1. After the selection signal sel switches from a low level to a high level and then a second duration Q2 has elapsed, the driving circuit 330 may determine that the second data line LD2 is in the first transmission mode t1 based on the high level of the selection signal sel and may receive the second data signal d2 via the second data line LD2.

In the NBM mode, the first control circuit 310 is a main control unit, the first data line LD1 is a transmission line, and the first control circuit 310 sends the first data signal d1 to the driving circuit 330 in the HS mode via the first data line LD1. In the AOD mode, the second control circuit 320 is the main control unit, the second data line LD2 is the transmission line, and the second control circuit 320 sends the second data signal d2 to the driving circuit 330 in the HS mode via the second data line LD2, so that the driving circuit 330 may perform operations such as gamma correction on the second data signal d2 and then send the obtained data voltage signal to the display panel 340. The data voltage signal represents the image information in the first data signal d2.

As shown in FIG. 3B, a frequency at which the first control circuit 310 and the second control circuit 320 send data signals depends on a frequency of Tear Effect (TE) signal and Vertical Synchronization (Vsync) signal. Each pulse of the TE signal and the Vsync signal is accompanied by a valid data signal sent by the first control circuit 310 or the second control circuit 320.

For example, in the NBM mode, the first control circuit 310 may communicate with the driving circuit 330 via the first data line LD1. At this time, the selection signal sel is at a low level, the first data line LD1 is in the HS mode, and the second data line LD2 is in the LP11 mode or the ULPS mode. The first control circuit 310 may send the first data signal d1 to the driving circuit 330 via the first data LD1. The frequency of the valid pulses of the first data signal d1 is consistent with the pulse frequency of the TE signal and the Vsync signal.

When the display mode needs to be switched from the NBM mode to the AOD mode, the first control circuit 310 may send a first switching command C1 to the second control circuit 320, indicating that the display panel 340 switches from the NBM mode to the AOD mode. After the first data line LD1 completes transmitting the first switching command C1, the first control circuit 310 may control the first data line LD1 to switch from the HS mode to the LP11 mode. At this time, the second control circuit 320 also controls the second data line LD2 to enter the LP11 mode.

For example, if the second data line LD2 is in the LP11 mode in the first display mode, the second control circuit 320 may keep the second data line LD2 in the LP11 mode when the first data line LD1 switches from the HS mode to the LP11 mode. If the second data line LD2 is in the ULPS mode in the first display mode, the second control circuit 320 switches the second data line LD2 from the ULPS mode to the LP11 mode when the first data line LD1 switches from the HS mode to the LP11 mode. When the second data line LD2 is in the ULPS mode, the second control circuit 320 needs to wake up the second data line LD2 first to enter the LP11 mode, which may pre-confirm that the second data line LD2 has a data transmission capability.

In embodiments of the present disclosure, in response to the first switching command C1, the second control circuit 320 may switch the selection signal sel from the first level to the second level after a first duration Q1 has elapsed, and control the second data line LD2 to switch from the LP11 mode to the HS mode after the selection signal sel has been at the second level for a second duration Q2.

For example, after the first control circuit 310 sends the first switching command C1, the second control circuit 320 may delay switching the selection signal sel from a low level to a high level. Therefore, before the selection signal sel switches to a high level, the first control circuit 310 may still transmit command signals at a low speed to the driving circuit 330 via the first data line LD1 if necessary, in order to meet the requirements of the first display mode of the display panel 340. After the first duration Q1 has elapsed, the second control circuit 320 may switch the selection signal sel from a low level to a high level. At this time, the first control circuit 310, the second control circuit 320 and the driving circuit 330 may synchronously confirm that they are about to enter the second display mode, and the hardware structures required for the second display mode may be reset or powered on. After the second duration Q2 has elapsed, the second control circuit 320 may switch the second data line LD2 from the LP11 mode to the HS mode. When the second data line LD2 switches from the LP11 mode to the HS mode, it may be considered that the transmission of data signals has been switched from the first data line LD1 to the second data line LD2.

For example, when only the first data line LD1 is in the HS mode, the display device operates in a state where data signals are transmitted to the driving circuit 330 via the first data line LD1. When only the second data line LD2 is in the HS mode, the display device operates in a state where data signals are transmitted to the driving circuit 330 via the second data line LD2.

In a process of switching from the NBM mode to the AOD mode, it is desired to switch the main control circuit from the first control circuit 310 to the second control circuit 320 and switch the transmission line from the first data line LD1 to the second data line LD2. When the second data line LD2 has been switched from the LP11 mode to the HS mode, the switch of the transmission line from the first data line LD1 to the second data line LD2 is achieved. The switch of the main control circuit may be completed during a period when the first data line LD1 and the second data line LD2 are both in the LP11 mode, so as to avoid a simultaneous occurrence of the switch of the main control circuit and the switch of the transmission line. By delaying the end of transmission by the first data line LD1 and delaying the start of transmission by the second data line LD2, it is possible to avoid a black screen on the display panel 340 caused by simultaneous occurrence of the switch of the main control circuit and the switch of the transmission line.

In the first duration Q1, the first control circuit 310 may control the hardware structures involved in the first display mode mode1 to enter a sleep or standby state. In the second duration Q2, the second control circuit 320 may wake up the hardware structures involved in the second display mode mode2. The time required to wake up hardware is longer than the time required to put hardware on standby, and a wake-up effect of the second control circuit 320 may affect a display effect in the second display mode mode2. Therefore, in order to avoid display anomalies caused by a hardware structure not being fully awakened, the second duration Q2 is set longer than the first duration Q1. For example, the first duration Q1 may satisfy 0.1 μs<Q1<2 μs, and the second duration Q2 may satisfy 32 μs<Q2<40 μs.

For example, the hardware structures involved in the first display mode mode1 and the second display mode mode2 may include hardware circuits such as a gate driving circuit, a source driving circuit, a timing control circuit, and a gamma correction circuit. For example, in the NBM mode, all sub-pixels in the display panel 340 may be refreshed, while in the AOD mode, sub-pixels in the display panel 340 are partially refreshed. Therefore, when switching from the NBM mode to the AOD mode, the hardware circuits used to control pixels that do not need to be refreshed may enter a sleep or standby state, and the hardware circuits used to control pixels that need to be refreshed remain in an active state. When switching from the AOD mode to the NBM mode, the hardware circuits that were previously in a sleep or standby state are awakened and enter an active state.

For example, the hardware structures involved in the first display mode mode1 and the second display mode mode2 may further include hardware components such as register(s) and signal line(s). For example, the register(s) and signal line(s) involved in the NBM mode may be different from those involved in the AOD mode. In the NBM mode, the register(s) and signal line(s) involved in the AOD mode may be in a standby or sleep state to reduce power consumption. When switching from the NBM mode to the AOD mode, the register(s) and signal line(s) involved in the NBM mode may enter a sleep or standby mode, and the register(s) and signal line(s) involved in the AOD mode may be awakened and enter an active state to store and transmit display data for the AOD mode. For example, the register may be located in the driving circuit 330, such as in a Touch and Display Driver Integration Circuit (TDDIC); or the register may be disposed separately, such as along with a capacitor Cap and a flash memory Flash.

When the second control circuit 320 wakes up the hardware required for the second display mode, the first control circuit 310 may also perform operations to control the hardware required for the first display mode mode1 to sleep. When the first control circuit 310 completes the sleep operation, the first display mode mode1 is switched to the second display mode mode2.

The switch of the main control circuit from the first control circuit 310 to the second control circuit 320 is completed in the time period corresponding to the first duration Q1 and the second duration Q2. After the time period corresponding to the first duration Q1 and the second duration Q2 ends, the first data line LD1 may switch from the LP11 mode to the ULPS mode or remain in the LP11 mode, and the second data line LD2 switches from the LP11 mode to the HS mode, thereby completing the switch of the main control circuit from the first data line LD1 to the second data line LD2.

In the time period corresponding to the first duration Q1 and the second duration Q2, the first data line LD1 and the second data line LD2 are both in the LP11 mode.

For the first data line LD1, after the first control circuit 310 completes sending the first switching command C1, the first control circuit 310 may control the first data line LD1 to switch from the HS mode (first transmission mode t1) to the LP11 mode. After the first duration Q1 and the second duration Q2 have elapsed, the first control circuit 310 may switch the first data line LD1 from the LP11 mode to the ULPS mode (second transmission mode t2) or continue to keep the first data line LD1 in the LP11 mode (second transmission mode t2). In the time period corresponding to the first duration Q1 and the second duration Q2, the first control circuit 310 may transmit necessary information to the driving circuit 330 in a low-power mode via the first data line LD1. For example, the first control circuit shown in FIG. 2 may receive information from a plurality of functional modules. After the first control circuit 310 completes sending the first switching command C1, the first control circuit 310 receives a command indicating a switch from the second display mode back to the first display mode, which is input by the user via other functional modules, in the time period corresponding to the first duration Q1. The first control circuit 310 may send the command indicating a switch from the second display mode to the first display mode to the driving circuit 330 and the second control circuit 320 because the switch of the main control unit has not yet completed.

For the second data line LD2, when the first data line LD1 switches from the HS mode to the LP11 mode, the second control circuit 320 may control the second data line LD2 to synchronously enter the LP11 mode. After the second data line LD2 enters the LP11 mode, the second control circuit 320 may transmit test data in a low-power mode via the second data line LD2 to detect whether the second data line LD2 has data transmission capability, so as to avoid failing to switch the second data line LD2 to the HS mode or avoid a case that the second data line LD2 fails to transmit the second data signal d2 in the second display mode. In a case that the switch of the main control unit from the first control circuit 310 to the second control circuit 320 is completed in the time period corresponding to the first duration Q1 and the second duration Q2, and the first control circuit 310 receives a command indicating a switch from the second display mode back to the first display mode, which is input by the user via other functional modules, the first control circuit 310 may send the command to the second control circuit, and the command is then transmitted to the driving circuit 330 by the second control circuit 320 via the second data line LD2 in a low-power mode (LP11 mode).

In embodiments of the present disclosure, in response to the first data line LD1 switching from the HS mode to the LP11 mode, the first control circuit 310 stops sending the first data signal d1 to the driving circuit 330. In response to the second data line LD2 switching from the LP11 mode to the HS mode, the second control circuit 320 sends the second data signal d2 to the driving circuit 330 via the second data line LD2.

In embodiments of the present disclosure, switch of the data signal is not performed during the switch from the first data line LD1 to the second data line LD2, so as to ensure that the display image is not refreshed during the switch of the transmission line and the main control unit, thereby avoiding a black screen during the switch of display mode.

For example, in response to the pulses of the TE signal and the Vsync signal after the switch of the transmission line and the switch of the main control unit are completed, the second control circuit 320 sends the second data signal d2 to the driving circuit 330 via the second data line LD2, thereby achieving the switch from the first data signal d1 to the second data signal d2 and enabling display in the second display mode.

For example, after the first control circuit 310 sends the first switching command C1 via the first data line LD1, the hardware structures involved in the NBM mode gradually enter a sleep or standby state. At this time, if the first control circuit 310 continues to send the first data signal d1 to the driving circuit 330, the display panel 340 may fail to display normally. In the time period corresponding to the second duration Q2, the hardware structures involved in the AOD mode are gradually awakened. At this time, if the second control circuit 320 sends the second data signal d2 to the driving circuit 330, the display panel 340 may also fail to display normally.

In addition, in a process of switching from the first display mode to the second display mode, when the switch of the main control unit from the first control circuit 310 to the second control unit 320 is completed, the switch of the transmission line from the first data line LD1 to the second data line LD2 has not yet completed. Therefore, if the switch of the main control unit is completed but the switch of the transmission line is not completed, the driving circuit 330 may fail to receive accurate data signals, resulting in abnormal display of the display panel 340.

For example, after the first control circuit 310 sends the first switching command C1 via the first data line LD1, the first control circuit 310 does not send the first data signal d1 via the first data line LD1. At this point, both the first data line LD1 and the second data line LD2 enter the LP11 state. Since the first data line LD1 and the second data line LD2 do not transmit data signals in the time period corresponding to the first duration Q1 and the second duration Q2, the first data line LD1 and the second data line LD2 may be controlled to enter the LP11 state, which may reduce the transmission power consumption of the first data line LD1 and the second data line LD2 and may also confirm the transmission capability of the first data line LD1 and the second data line LD2.

When the second data line LD2 switches from the LP11 mode to the HS mode, the first data line LD1 may switch from the LP11 mode to the ULPS mode or remain in the LP11 mode. At this point, it may be considered that the transmission line has been switched from the first data line LD1 to the second data line LD2, and all hardware structures involved in the AOD mode have been awakened. Therefore, the second control circuit 320 may send the second data signal d2 via the second data line LD2 so that the driving circuit 330 drives the display panel 340 to display images in the AOD mode.

In some embodiments, after the second control circuit 320 has controlled the second data line LD2 to switch from the LP11 mode to the HS mode, the second control circuit 320 may start sending the second data signal d2 via the second data line LD2 at a start pulse of a next TE signal and Vsync signal. In embodiments of the present disclosure, the driving circuit 330 includes a first unit and a second unit. The first unit is electrically connected to the first data line LD1 and is used to process the first data signal d1. The second unit is electrically connected to the second data line LD2 and is used process the second data signal d2.

For example, the first control circuit 310 may send the first data signal d1 via the first data line LD1, and the first unit may receive and process the first data signal d1 to send a scan signal and a data voltage signal to the display panel 340, so that an image represented by the first data signal d1 is displayed on the display panel 340.

In embodiments of the present disclosure, after the first control circuit 310 sends the first switching command C1 to the driving circuit 330 via the first data line LD1, the driving circuit 330 may, in response to the first switching command C1, control the first unit to switch from an active state to a sleep state and control the second unit to switch from a sleep state to an active state.

For example, the first unit may stop processing the first data signal d1 when entering a sleep state. The second unit may process the received second data signal d2 when entering an active state.

For example, the driving circuit 330 may be a chip, the first unit may be a first pin of the chip electrically connected to the first data line LD1, and the second unit may be a second pin of the chip electrically connected to the second data line LD2. In response to the first switching command C1, the driving circuit 330 may control the first pin to stop receiving the first data signal d1 and control the second pin to start receiving the second data signal d2.

In embodiments of the present disclosure, when the display panel 340 is powered on, the first control circuit 310 may control the selection signal sel to be at the first level and establish a communicative connection with the driving circuit 330 via the first data line LD1.

For example, when the display panel 340 is powered on, the first control circuit 310 is activated by default so as to serve as the main control unit. In this case, the display panel 340 may enter the first display mode by default, with the first data line LD1 as the transmission line. The first control circuit 320 communicates with the driving circuit 330 via the first data line LD1.

In embodiments of the present disclosure, when the display panel 340 needs to switch from the first display mode to the second display mode, the second control circuit 320 is activated so as to serve as the main control unit. In this case, the second data line LD2 is used as the transmission line, and the second control circuit 320 communicates with the driving circuit 330 via the second data line LD2.

In embodiments of the present disclosure, in the first display mode, the first data line LD1 may transmit the first data signal d1 at a first rate, and in the second display mode, the second data line LD2 may transmit the second data signal d2 at a second rate. The first rate is greater than the second rate.

For example, in the first display mode, the first data line LD1 may transmit the first data signal d1 at X Mbps, and in the second display mode, the second data line LD2 may transmit the second data signal d2 at X/2 Mbps. Due to the lower refresh rate in the second display mode, the second data line LD2 may transmit the second data signal d2 at a lower transmission rate, thereby reducing the transmission power consumption and enabling the display device to enter the Always on Display (AOD) mode.

Figure 4A:
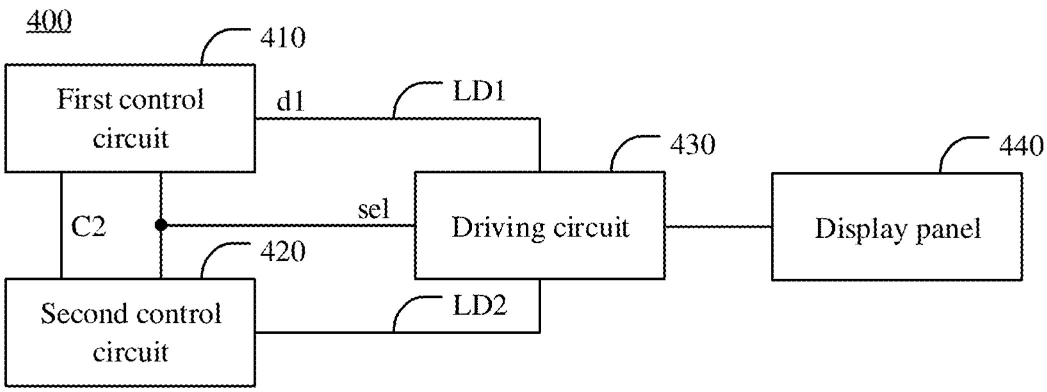
FIG. 4A shows a schematic structural diagram of a display device according to another embodiment of the present disclosure.

FIG. 4A shows a schematic structural diagram of a display device according to another embodiment of the present disclosure.

As shown in FIG. 4A, a display device 400 includes a first control circuit 410, a second control circuit 420, a driving circuit 430, and a display panel 440.

In embodiments of the present disclosure, for the first control circuit 410, the second control circuit 420, the driving circuit 430 and the display panel 440, reference may be made to the first control circuit 110, the second control circuit 120, the driving circuit 130 and the display panel 140 described above. For conciseness, similar parts will not be repeated here.

In embodiments of the present disclosure, the second control circuit 420 may send a second switching command C2, which indicates a switch from the second display mode to the first display mode, to the first control circuit 410, and control the second data line LD2 to switch from the first transmission mode to the second transmission mode. In response to the second switching command C2, the first control circuit 410 may switch the selection signal sel from the second level to the first level, and control the first data line LD1 to switch from the second transmission mode to the first transmission mode.

In embodiments of the present disclosure, the display panel 440 is currently controlled by the second control circuit 420 and operating in the second display mode. When the display panel 440 switches from the second display mode to the first display mode, the second control circuit 420 may send the second switching command C2 to the first control circuit 410, so that the first control circuit 410 controls the display panel 440 to display in the first display mode.

For example, the second control circuit 420 may send the second switching command C2 directly to the first control circuit 410, or the second control circuit 420 may write the second switching command C2 to a register and the first control circuit 410 may read the second switching command C2 from the register.

After the display panel 440 switches from the second display mode to the first display mode, the second control circuit 420 and the second data line LD2 may not participate in data transmission or perform little data transmission. Therefore, the second control circuit 420 may switch the second data line LD2 from the HS transmission mode to the LP mode, thereby reducing the transmission power consumption generated by the second data line LD2 in the first display mode.

For example, the second control circuit 420 may further switch the second data line LD2 from the HS transmission mode to the ULPS mode. When the second data line LD2 is in the ULPS mode, the second data line LD2 is in a floating state and does not transmit data signals.

After the display panel 440 switches from the second display mode to the first display mode, the first control circuit 410 and the first data line LD1 may participate in data transmission. Therefore, the first control circuit 410 may switch the first data line LD1 from the LP transmission mode to the HS mode to improve the transmission efficiency of the first data line LD1.

For example, the first data line LD1 may be in the ULPS mode before the display panel 440 switches from the second display mode to the first display mode. The first control circuit 410 may switch the first data line LD1 from the ULPS transmission mode to the HS mode.

Figure 4B:
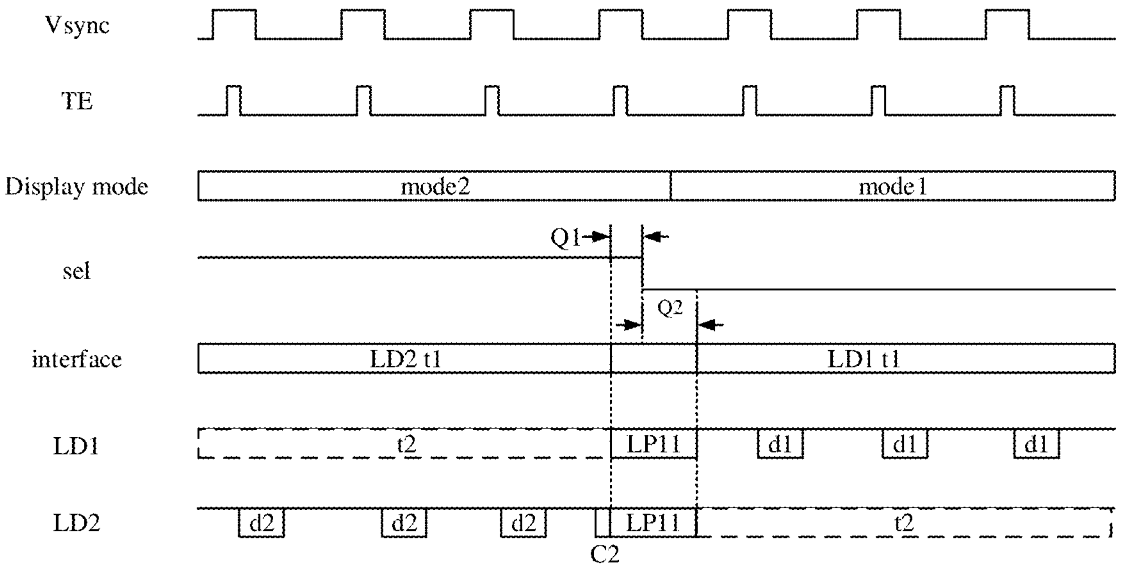
FIG. 4B shows a schematic timing diagram of signals according to another embodiment of the present disclosure.

FIG. 4B shows a schematic timing diagram of signals according to another embodiment of the present disclosure. A process of switching the display panel from the second display mode to the first display mode will be schematically described with reference to FIG. 4A and FIG. 4B.

For the first display mode mode1, the second display mode mode2, the first transmission mode t1, the second transmission mode t2, the selection signal sel, the data line information interface, the TE signal and the Vsync signal shown in FIG. 4B, reference may be made to the description of FIG. 3B. For conciseness, details will not be repeated here.

For example, in the AOD mode, the second control circuit 420 may communicate with the driving circuit 430 via the second data line LD2. At this time, the selection signal sel is at a high level, the second data line LD2 is in the HS mode, and the first data line LD1 is in the LP11 mode or the ULPS mode. The second control circuit 420 may send the second data signal d2 to the driving circuit 430 via the second data line LD2. A frequency of valid pulses of the second data signal d2 is consistent with a pulse frequency of the TE signal and the Vsync signal.

When the display mode needs to switch from the AOD mode to the NBM mode, the second control circuit 420 may send a second switching command C2 to the first control circuit 410, indicating that the display panel 440 switches from the AOD mode to the NBM mode. After the second data line LD2 completes transmitting the second switching command C2, the second control circuit 420 may control the second data line LD2 to switch from the HS mode to the LP11 mode. At this time, the first control circuit 410 may also control the first data line LD1 to enter the LP11 mode.

For example, if the first data line LD1 is in the LP11 mode in the second display mode, the first control circuit 410 may keep the first data line LD1 in the LP11 mode when the second data line LD2 switches from the HS mode to the LP11 mode. If the first data line LD1 is in the ULPS mode in the second display mode, the first control circuit 410 may switch the first data line LD1 from the ULPS mode to the LP11 mode when the second data line LD2 switches from the HS mode to the LP11 mode. When the first data line LD1 is in the ULPS mode, the first control circuit 410 needs to wake up the first data line LD1 first to enter the LP11 mode, which may pre-confirm that the first data line LD1 has a data transmission capability.

In embodiments of the present disclosure, in response to the second switching command C2, the first control circuit 410 switches the selection signal sel from the second level to the first level after a first duration Q1 has elapsed, and control the first data line LD1 to switch from the LP11 mode to the HS mode after the selection signal sel has been at the first level for a second duration Q2.

For example, after the second control circuit 420 sends the second switching command C2, the first control circuit 410 may delay switching the selection signal sel from a high level to a low level. Therefore, before the selection signal sel switches to a low level, the second control circuit 420 may still transmit a command signal to the driving circuit 430 at a low speed via the second data line LD2 if necessary, in order to meet the requirements of the first display mode of the display panel 440. After the first duration Q1 has elapsed, the first control circuit 410 may switch the selection signal sel from a high level to a low level. At this time, the first control circuit 410, the second control circuit 420 and the driving circuit 430 may synchronously confirm that they are about to enter the first display mode, and the hardware structures required for the first display mode may be reset or powered on. After the second duration Q2 has elapsed, the first control circuit 410 may switch the first data line LD1 from the LP11 mode to the HS mode. When the first data line LD1 switches from the LP11 mode to the HS mode, it may be considered that the transmission line has been switched from the second data line LD2 to the first data line LD1.

In embodiments of the present disclosure, in response to the second data line LD2 switching from the HS mode to the LP11 mode, the second control circuit 420 may stop sending the second data signal d2 to the driving circuit 430. In response to the first data line LD1 switching from the LP11 mode to the HS mode, the first control circuit 410 may send the first data signal d1 to the driving circuit 430 via the first data line LD1.

For example, in response to the pulses of the TE signal and the Vsync signal after the switch of the transmission line and the main control unit is completed, the first control circuit 410 may send the first data signal d1 to the driving circuit 430 via the first data line LD1, thereby achieving the switch from the second data signal d2 to the first data signal d1 and enabling display in the first display mode.

In some embodiments, after the first control circuit 410 controls the first data line LD1 to switch from the LP11 mode to the HS mode, the first control circuit 410 may start sending the first data signal d1 via the first data line LD1 at a start pulse of a next TE signal and Vsync signal.

In embodiments of the present disclosure, the second control circuit 420 may send a second switching command C2 to the driving circuit 430 via the second data line LD2. In response to the second switching command C2, the driving circuit 430 may control the first unit to switch from a sleep state to an active state and control the second unit to switch from an active state to a sleep state.

For example, the second unit may stop processing the second data signal d2 when entering the sleep state, and the first unit may process the received first data signal d1 when entering the active state.

In embodiments of the present disclosure, in the second display mode, the second data line LD2 may transmit the second data signal d2 at X/2 Mbps. After switching from the second display mode to the first display mode, the first data line LD1 may transmit the first data signal d1 at X Mbps in the first display mode, where X is a positive number. In this way, the transmission power consumption of the data line may be reduced in the second display mode where the display image is refreshed at a low rate.

Figure 5:
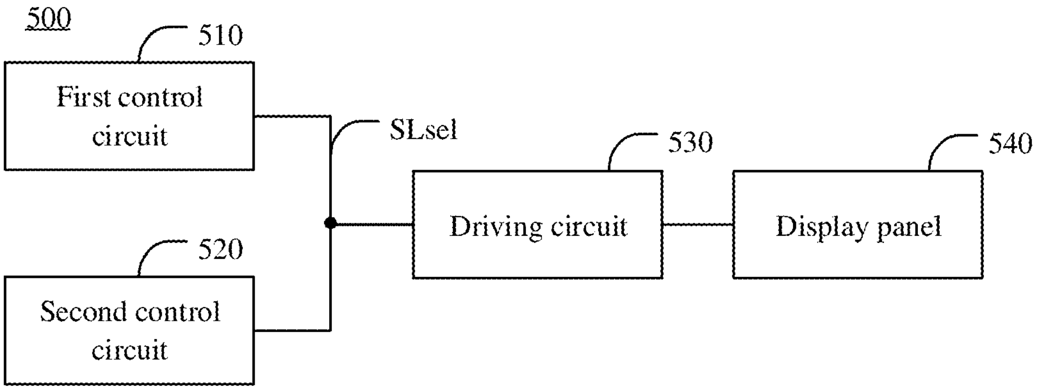
FIG. 5 shows a schematic structural diagram of a display device according to another embodiment of the present disclosure.

FIG. 5 shows a schematic structural diagram of a display device according to another embodiment of the present disclosure.

As shown in FIG. 5, a display device 500 includes a first control circuit 510, a second control circuit 520, a driving circuit 530, and a display panel 540.

In embodiments of the present disclosure, for the first control circuit 510, the second control circuit 520, the driving circuit 530 and the display panel 540, reference may be made to the first control circuit 110, the second control circuit 120, the driving circuit 130 and the display panel 140 described above. For conciseness, similar parts will not be repeated here.

In embodiments of the present disclosure, both the first control circuit 510 and the second control circuit 520 are electrically connected to the driving circuit 530 via a selection signal line SLsel, and the selection signal is transmitted from the driving circuit 530 to the first control circuit 510 and the second control circuit 520 via the selection signal line SLsel.

In embodiments of the present disclosure, when the level of the selection signal changes, the first control circuit 510 and the second control circuit 520 may determine the level of the selection signal directly via the selection signal line SLsel, so as to switch the display mode and switch the transmission mode of the data line, thereby ensuring synchronization of the first control circuit 510 and the second control circuit 520 in acquiring the level of the selection signal.

Figure 6A:
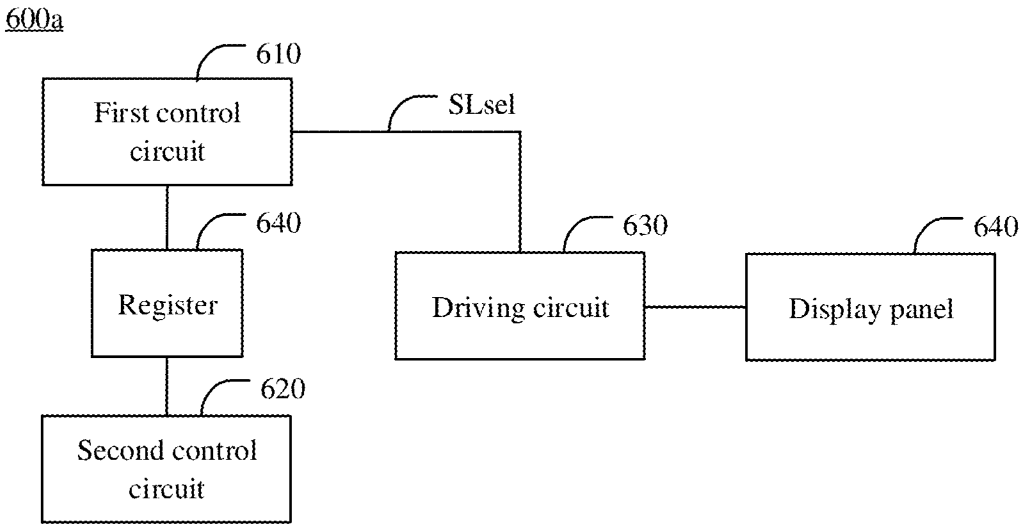
FIG. 6A shows a schematic structural diagram of a display device according to another embodiment of the present disclosure.

FIG. 6A shows a schematic structural diagram of a display device according to another embodiment of the present disclosure.

As shown in FIG. 6A, a display device 600*a* includes a first control circuit 610, a second control circuit 620, a driving circuit 630, a display panel 640, and a register 650.

In embodiments of the present disclosure, for the first control circuit 610, the second control circuit 620, the driving circuit 630 and the display panel 640, reference may be made to the first control circuit 110, the second control circuit 120, the driving circuit 130 and the display panel 140 described above. For conciseness, similar parts will not be repeated here.

In embodiments of the present disclosure, the first control circuit 610 is electrically connected to the driving circuit 630 via a selection signal line SLsel. A selection signal may be transmitted from the driving circuit 630 to the first control circuit 610 via the selection signal line SLsel, and the first control circuit 610 may write the selection signal into the register 650. The register 650 stores the selection signal written by the first control circuit 610, and the second control circuit 620 may read the selection signal from the register 650.

For example, the first control circuit 610 may control the selection signal to be at a low level and write the low level of the selection signal into the register 650. The second control circuit 620 may read the low level from the register 650 and control the second data line to operate in the LP11 mode or the ULPS mode.

Figure 6B:
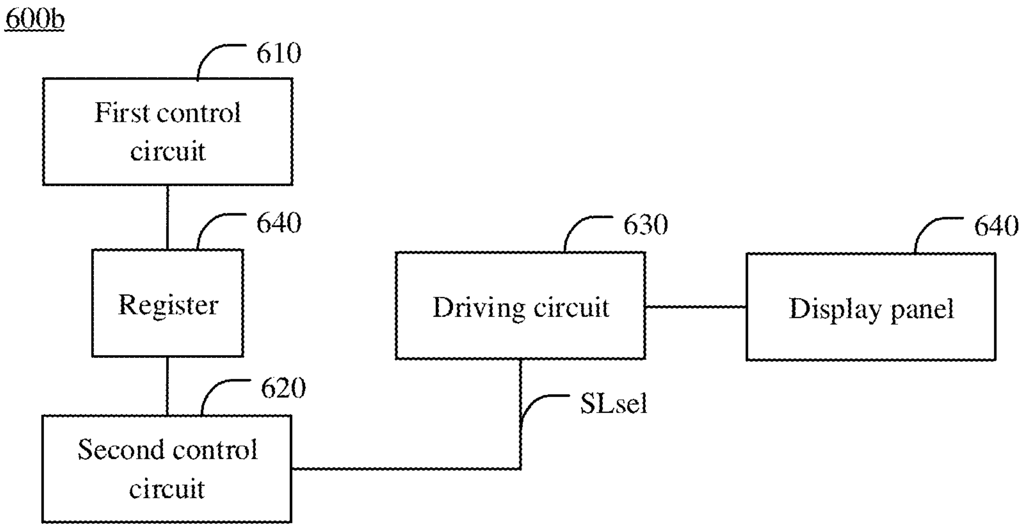
FIG. 6B shows a schematic structural diagram of a display device according to another embodiment of the present disclosure.

FIG. 6B shows a schematic structural diagram of a display device according to another embodiment of the present disclosure.

As shown in FIG. 6B, a display device 600*b* includes a first control circuit 610, a second control circuit 620, a driving circuit 630, a display panel 640, and a register 650.

In embodiments of the present disclosure, for the first control circuit 610, the second control circuit 620, the driving circuit 630 and the display panel 640, reference may be made to the first control circuit 110, the second control circuit 120, the driving circuit 130 and the display panel 140 described above. For conciseness, similar parts will not be repeated here.

In embodiments of the present disclosure, the second control circuit 620 is electrically connected to the driving circuit 630 via a selection signal line SLsel. A selection signal may be transmitted from the driving circuit 630 to the second control circuit 620 via the selection signal line SLsel, and the second control circuit 620 may write the selection signal into the register 650. The register 650 stores the selection signal written by the second control circuit 620, and the first control circuit 610 may read the selection signal from the register 650.

For example, the second control circuit 620 may control the selection signal to be at a high level and write the high level of the selection signal into the register 650. The first control circuit 610 may read the high level from the register 650 and control the first data line to operate in the LP11 mode or the ULPS mode.

Figure 7A:
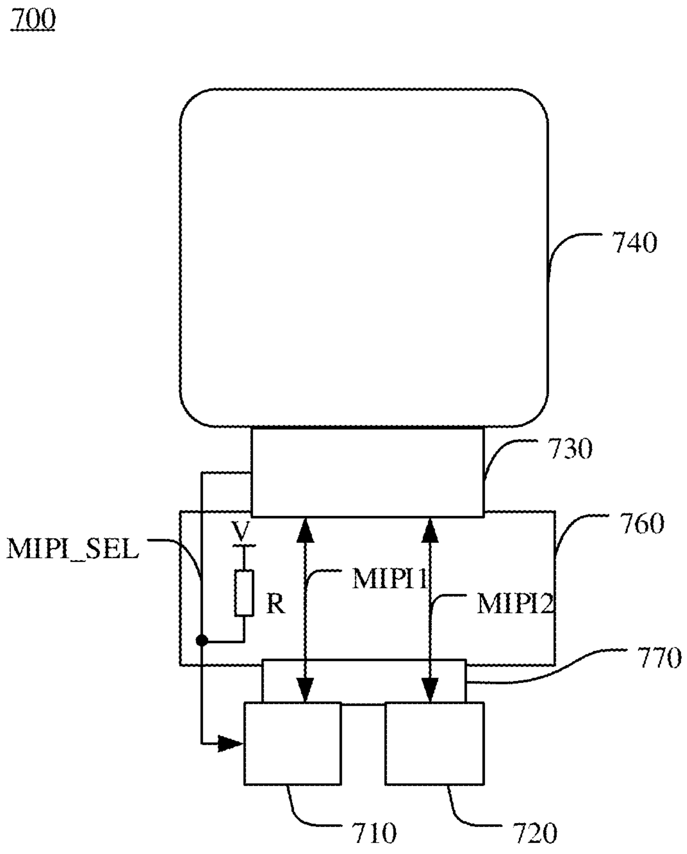
FIG. 7A shows a schematic structural diagram of a display device according to another embodiment of the present disclosure.

FIG. 7A shows a schematic structural diagram of a display device according to an embodiment of the present disclosure.

As shown in FIG. 7A, a display device 700 includes a first control circuit 710, a second control circuit 720, a driving circuit 730, a display panel 740, a circuit board 760, a connector 770, a data line MIPI1, a data line MIPI2, a selection signal line MIPI_SEL, and a pull-down resistor R.

In embodiments of the present disclosure, for the first control circuit 710, the second control circuit 720, the driving circuit 730 and the display panel 740, reference may be made to the first control circuit 110, the second control circuit 120, the driving circuit 130 and the display panel 140 described above. For conciseness, similar parts will not be repeated here.

In embodiments of the present disclosure, the data line MIPI1 and the data line MIPI2 are Mobile Industry Processor Interface (MIPI) data lines. The first control circuit 710 is electrically connected to the driving circuit 730 via the data line MIPI1, and the second control circuit 720 is electrically connected to the driving circuit 730 via the data line MIPI2. The data line MIPI1 may be the first data line LD1 mentioned above, and the data line MIPI2 may be the second data line LD2 mentioned above.

In embodiments of the present disclosure, for a process of switching the display panel 740 from the first display mode to the second display mode, reference may be made to the above description of FIG. 3B. For a process of switching the display panel 740 from the second display mode to the first display mode, reference may be made to the above description of FIG. 4B. For conciseness, details will not be repeated here.

In embodiments of the present disclosure, the driving circuit 730 includes a selection pin. The selection pin is electrically connected to a first end of the selection signal line MIPI_SEL and a first end of the pull-down resistor R. A second end of the pull-down resistor R is connected to a target power supply V, and a target power supply voltage of the target power supply is consistent with the first level.

For example, the first control circuit 710 is electrically connected to the driving circuit 730 via the data line MIPI1, which is the first data line LD1 mentioned above. When the selection signal is at a low level (where the first level is a low level), the first control circuit 710 may send the first data signal to the driving circuit 730 via the data line MIPI1.

In embodiments of the present disclosure, the first control circuit 710 is electrically connected to the driving circuit 730 via the selection signal line MIPI_SEL. For the method by which the first control circuit 710 and the second control circuit 720 determine the level of the selection signal, reference may be made to FIG. 6A. For conciseness, details will not be repeated here.

In some embodiments, the second control circuit 720 may also be electrically connected to the driving circuit 730 via the selection signal line MIPI_SEL. For the method by which the first control circuit 710 and the second control circuit 720 determine the level of the selection signal, reference may be made to FIG. 6B. The first control circuit 710 and the second control circuit 720 may also both be connected to the driving circuit 730 via the selection signal line MIPI_SEL. For the method by which the first control circuit 710 and the second control circuit 720 determine the level of the selection signal, reference may be made to FIG. 5. For conciseness, details will not be repeated here.

In some embodiments, the first control circuit 710 and the second control circuit 720 may be electrically connected to the driving circuit 730 respectively via two selection signal lines. The driving circuit 730 may send selection signals to the first control circuit 710 and the second control circuit 720 via the two selection signal lines, and the selection signals transmitted over the two selection signal lines are consistent. In embodiments of the present disclosure, the second end of the pull-down resistor R may be grounded (target power supply V), and the target power supply voltage of the target power supply V is 0 V. When the display panel 740 is powered on, the level of the selection pin may be set to 0 V, and the level of the selection signal is 0 V (low level). In response to the low level of the selection signal, the first control circuit 710 may establish a communicative connection with the driving circuit 730 via the data line MIPI1.

In embodiments of the present disclosure, the pull-down resistor R has a resistance greater than 500 KΩ, such as 1 MΩ. The resistance value of the pull-down resistor R may affect a magnitude of a leakage current in the selection signal line MIPI_SEL. Taking the high level of the selection pin as 1.8V as an example, the resistance of 500 KΩ corresponds to a leakage current of 3.6 μA, and the resistance of 1 MΩ corresponds to a leakage current of 1.8 μA. Therefore, the leakage current generated in the selection signal line MIPI_SEL is negligible.

In embodiments of the present disclosure, the driving circuit 730 includes a first pin and a second pin. The data line MIPI1 is routed from the first pin, and the data line MIPI2 is routed from the second pin. The data line MIPI1 and the data line MIPI2 are arranged on a fan-out packaging (FOP) circuit board, which is bonded to the circuit board 760. The data line MIPI1 and the data line MIPI2 span the FOP circuit board and the circuit board 760 and are connected to the connector 770. The connector 770 is mated with the first control circuit 710 and the second control circuit 720, thereby establishing a communicative connection between the first control circuit 710/the second control circuit 720 and the driving circuit 730.

In embodiments of the present disclosure, the circuit board 760 may be a Main Flexible Printed Circuit (MFPC), and the connector 770 may be a Board-to-Board (BTB) connector.

Figure 7B:
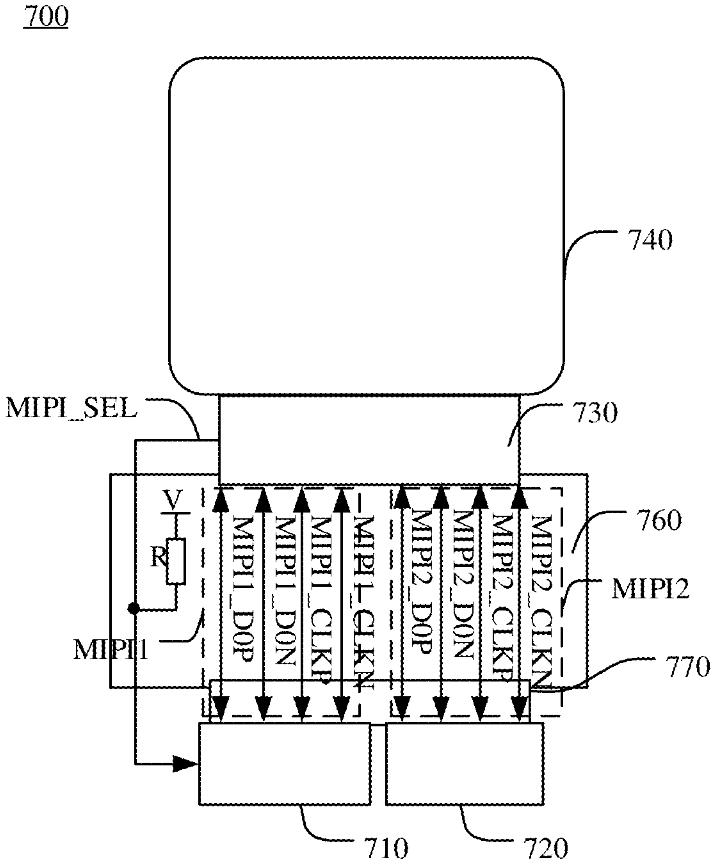
FIG. 7B shows a schematic structural diagram of a display device according to another embodiment of the present disclosure.

In embodiments of the present disclosure, the data line MIPI1 and the data line MIPI2 may each include a plurality of data lines. The data line MIPI1 and the data line MIPI2 will be schematically described below with reference to FIG. 7A and FIG. 7B. FIG. 7B shows a schematic structural diagram of a display device according to another embodiment of the present disclosure.

As shown in FIG. 7B, the data line MIPI1 may include a clock positive line MIPI1_CLKP, a clock negative line MIPI1_CLKN, a data channel 0 positive line MIPI1_D0P, and a data channel 0 positive line MIPI1_D0N. The data line MIPI2 may include a clock positive line MIPI2_CLKP, a clock negative line MIPI2_CLKN, a data channel 0 positive line MIPI2_D0P, and a data channel 0 positive line MIPI2_D0N.

In embodiments of the present disclosure, the clock positive line MIPI1_CLKP, the clock negative line MIPI1_CLKN, the data channel 0 positive line MIPI1_D0P and the data channel 0 positive line MIPI1_D0N may be used to transmit various signals from the first control circuit 710 to the driving circuit 730. The clock positive line MIPI2_CLKP, the clock negative line MIPI2_CLKN, the data channel 0 positive line MIPI2_D0P and the data channel 0 positive line MIPI1_D0N may be used to transmit various signals from the second control circuit 720 to the driving circuit 730.

A stacked structure of the display device will be exemplarily described with reference to FIG. 8A, FIG. 8B and FIG. 8C.

Figure 8A:
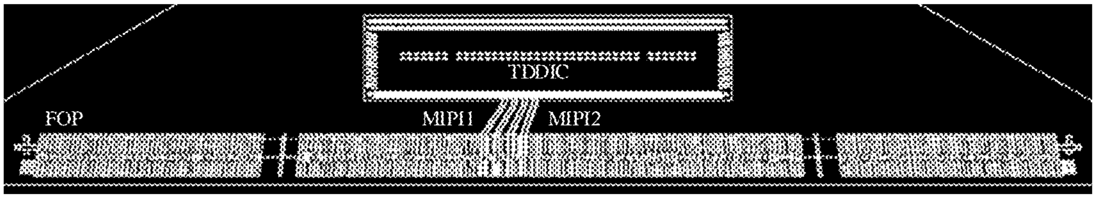
FIG. 8A shows a stacked structure diagram of a display device according to an embodiment of the present disclosure.

FIG. 8A shows a schematic stacked structure diagram of a display device according to an embodiment of the present disclosure.

As shown in FIG. 8A, the TDDIC (driving circuit) may route the data line MIPI1 and the data line MIPI2 to the pins of the FOP. Both the TDDIC and the FOP may be disposed in the non-display region of the display panel.

The TDDIC includes a plurality of pins related to the data line MIPI1 and the data line MIPI2, such as MIPI clock positive MIPI_CLKP, MIPI clock negative MIPI_CLKN, MIPI data channel 0 positive MIPI_D0P, and MIPI data channel 0 positive MIPI_D0N. Each pin may be used to route one of a set of MIPI data lines related to the data line MIPI1 and the data line MIPI2.

For example, a set of MIPI clock positive MIPI_CLKP, MIPI clock negative MIPI_CLKN, MIPI data channel 0 positive MIPI_D0P and MIPI data channel 0 positive MIPI_D0N may be used to route a set of MIPI data lines for the data line MIPI1, and another set of MIPI clock positive MIPI_CLKP, MIPI clock negative MIPI_CLKN, MIPI data channel 0 positive MIPI_D0P and MIPI data channel 0 positive MIPI_D0N may be used to route a set of MIPI data lines for the data line MIPI2.

Figure 8B:
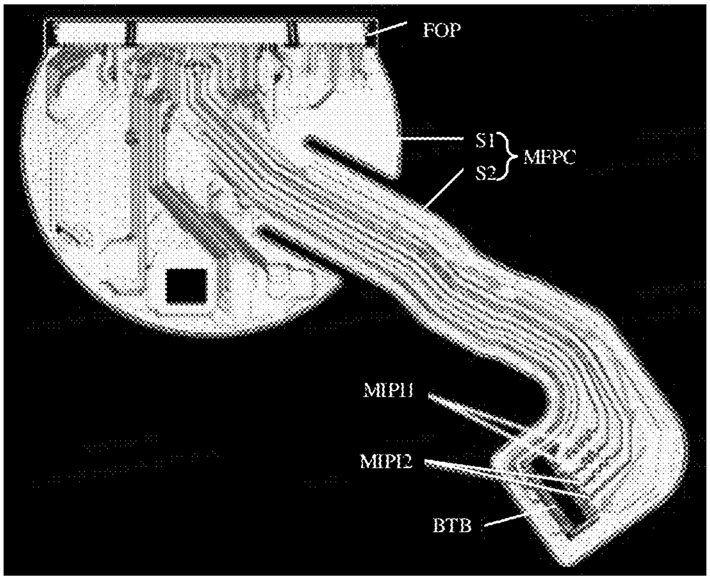
FIG. 8B shows a stacked structure diagram of a display device according to another embodiment of the present disclosure.

FIG. 8B shows a schematic stacked structure diagram of a display device according to another embodiment of the present disclosure.

As shown in FIG. 8B, the FOP circuit board is bonded to the MFPC, and the data line MIPI1 and the data line MIPI2 span the FOP circuit board and the MFPC and are connected to the BTB.

The MFPC includes a first region S1 and a second region S2. A shape of the first region S1 may be consistent with a shape of the display device. The second region S2 may be an extended region of the first region S1, and the second region S2 may be bent to overlap with the first region S1 to reduce an area of an orthographic projection of the MFPC.

Figure 8C:
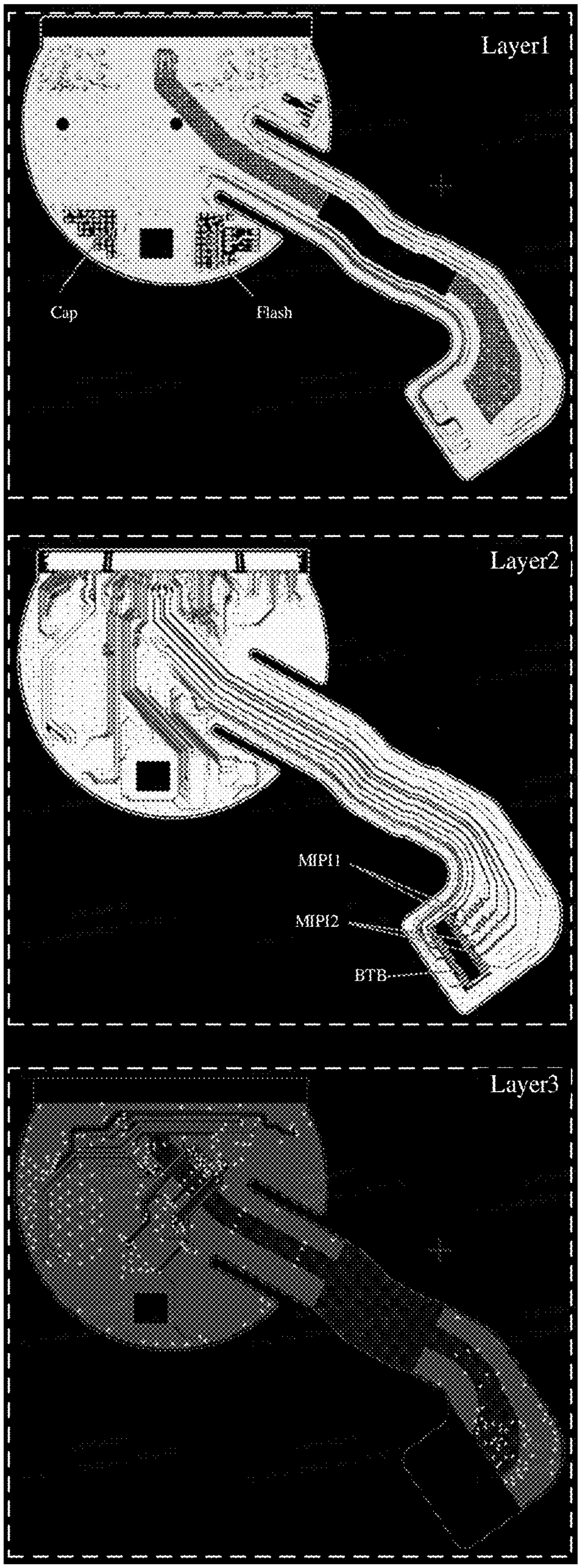
FIG. 8C shows a stacked structure diagram of a display device according to another embodiment of the present disclosure.

FIG. 8C shows a schematic stacked structure diagram of a display device according to another embodiment of the present disclosure.

As shown in FIG. 8C, the MFPC includes a trace layer Layer1, a trace layer Layer2, and a trace layer Layer3.

The data line MIPI1, the data line MIPI2 and the BTB may be disposed in the trace layer Layer2, and the region of the MFPC bonded to the FOP is disposed in the trace layer Layer2. The trace layer Layer1 may be provided with a capacitor Cap and a flash memory Flash, and the trace layer Layer3 may be provided with power lines, etc.

Figure 9:
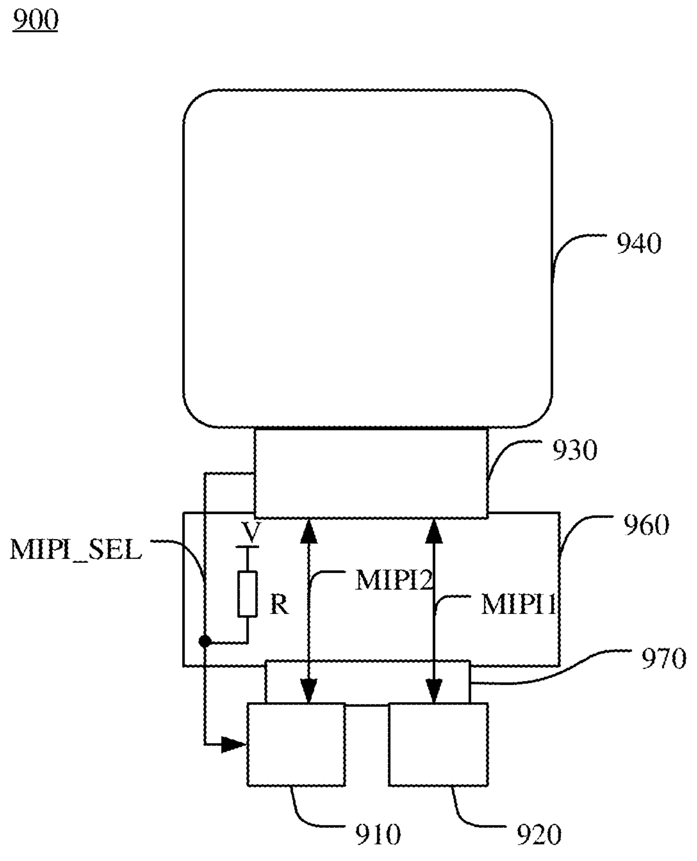
FIG. 9 shows a schematic structural diagram of a display device according to another embodiment of the present disclosure.

FIG. 9 shows a schematic structural diagram of a display device according to another embodiment of the present disclosure.

As shown in FIG. 9, a display device 900 includes a first control circuit 910, a second control circuit 920, a driving circuit 930, a display panel 940, a circuit board 960, a connector 970, a data line MIPI1, a data line MIPI2, a selection signal line MIPI_SEL, and a pull-down resistor R.

In embodiments of the present disclosure, for the first control circuit 910, the second control circuit 920, the driving circuit 930 and the display panel 940, reference may be made to the first control circuit 110, the second control circuit 120, the driving circuit 130 and the display panel 140 described above. For the circuit board 960, the connector 970, the selection signal line MIPI_SEL and the pull-down resistor R, reference may be made to the circuit board 760, the connector 770, the selection signal line MIPI_SEL and the pull-down resistor R shown in FIG. 7. For conciseness, similar parts will not be repeated here.

In embodiments of the present disclosure, the first control circuit 910 is electrically connected to the driving circuit 930 via the data line MIPI2, and the second control circuit 920 is electrically connected to the driving circuit 930 via the data line MIPI1. The data line MIPI2 may be the first data line LD1 mentioned above, and the data line MIPI1 may be the second data line LD2 mentioned above. The data line MIPI2 may be the first data line LD1 mentioned above, and the data line MIPI1 may be the second data line LD2 mentioned above.

In embodiments of the present disclosure, since the first control circuit 910 is electrically connected to the driving circuit 930 via the data line MIPI2, which is the second data line LD2 mentioned above, the first control circuit 910 may send the first data signal to the driving circuit 930 via the data line MIPI1 when the selection signal is at a high level (where the first level is a high level), In embodiments of the present disclosure, the target power supply voltage of the target power supply V is 1.8 V. When the display panel 940 is powered on, the level of the selection pin may be set to 1.8 V, and the level of the selection signal is 1.8 V (high level). In response to the high level of the selection signal, the first control circuit 910 may establish a communicative connection with the driving circuit 930 via the data line MIPI1.

Figure 10A:
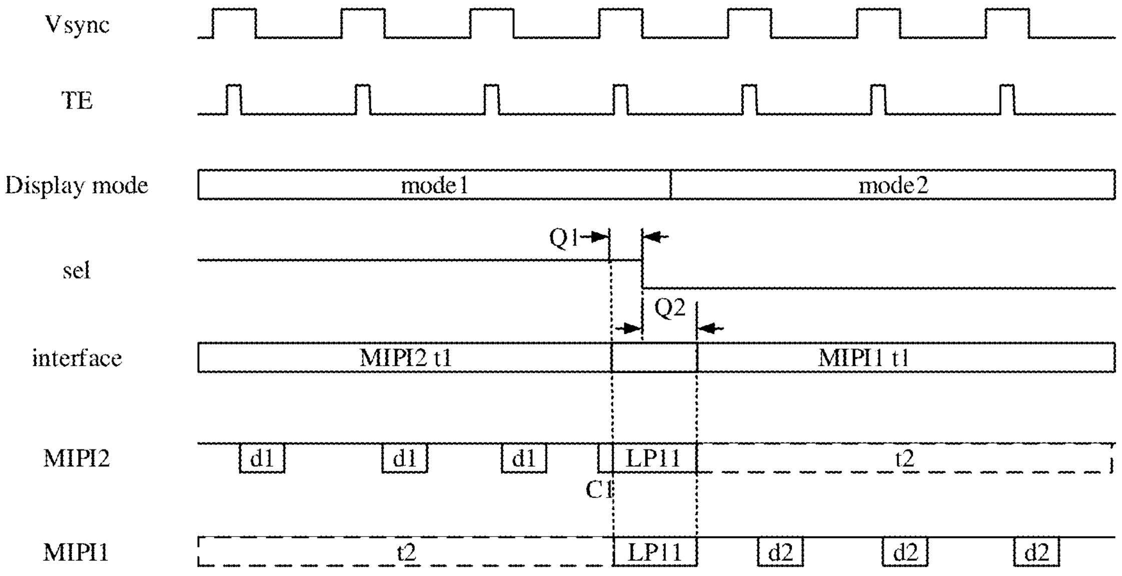
FIG. 10A shows a schematic timing diagram of signals according to another embodiment of the present disclosure.
Figure 10B:
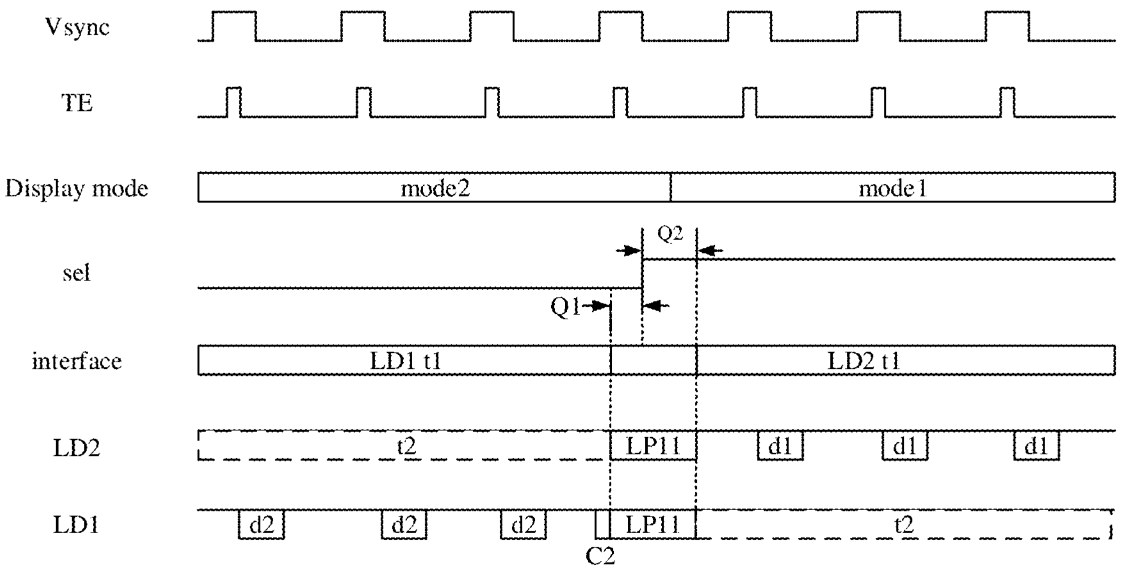
FIG. 10B shows a schematic timing diagram of signals according to another embodiment of the present disclosure.

FIG. 10A shows a schematic timing diagram of signals according to another embodiment of the present disclosure, and FIG. 10B shows a schematic timing diagram of signals according to another embodiment of the present disclosure. FIG. 10A shows the signal timing when the display panel 940 switches from the first display mode mode1 to the second display mode mode2, and FIG. 10B shows the signal timing when the display panel 940 switches from the second display mode mode2 to the first display mode mode1. The first display mode mode1 is the NBM mode, and the second display mode mode2 is the AOD mode.

In embodiments of the present disclosure, for a process of switching the display panel 940 from the first display mode to the second display mode shown in FIG. 10A, reference may be made to the description of FIG. 3B. For a process of switching the display panel 940 from the second display mode to the first display mode shown in FIG. 10B, reference may be made to the description of FIG. 4B. For conciseness, similar parts will not be repeated here.

It should be noted that in the first display mode, the selection signal sel is at a high level, the data line MIPI2 is the transmission line, and the first control circuit 910 is communicatively connected to the driving circuit 930 via the data line MIPI2. In the second display mode, the selection signal sel is at a low level, the data line MIPI1 is the transmission line, and the second control circuit 920 is communicatively connected to the driving circuit 930 via the data line MIPI1.

In embodiments of the present disclosure, the selection signal sel indicates whether the data line MIPI1 or the data line MIPI2 is to transmit data signals. For example, a low level of the selection signal sel indicates that the data line MIPI1 transmits data signals, and a high level of the selection signal sel indicates that the data line MIPI2 transmits data signals. Therefore, when the first control circuit is electrically connected to the data line MIPI1 and the second control circuit is electrically connected to the data line MIPI2, the selection signal sel is at a low level in the first display mode and at a high level in the second display mode. When the first control circuit is electrically connected to the data line MIPI2 and the second control circuit is electrically connected to the data line MIPI1, the selection signal sel is at a high level in the first display mode and at a low level in the second display mode.

Figure 11:
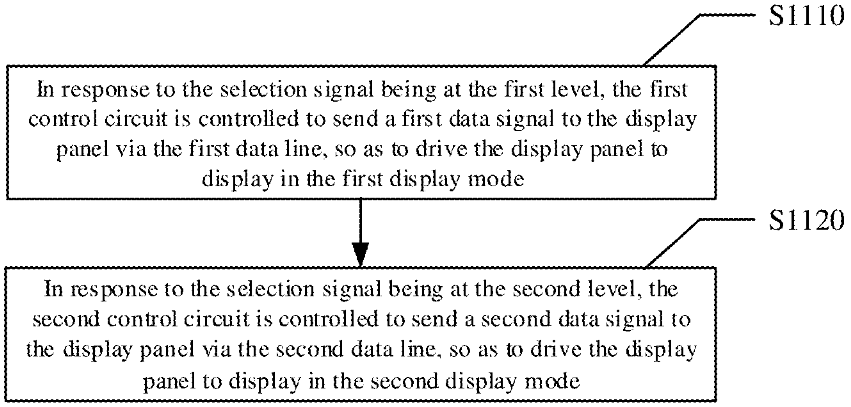
FIG. 11 shows a flowchart of a display method according to an embodiment of the present disclosure.

FIG. 11 shows a flowchart of a display method according to an embodiment of the present disclosure.

As shown in FIG. 11, the display method includes step S1110 and step S1120.

In embodiments of the present disclosure, the display method may be applied to the display device 100, the display device 300, the display device 400, the display device 500, the display device 600, the display device 700 and the display device 900 described above.

In step S1110, in response to the selection signal being at the first level, the first control circuit is controlled to send a first data signal to the display panel via the first data line, so as to drive the display panel to display in the first display mode.

In step S1120, in response to the selection signal being at the second level, the second control circuit is controlled to send a second data signal to the display panel via the second data line, so as to drive the display panel to display in the second display mode.

In embodiments of the present disclosure, step S1110 and step S1120 are similar to the operations performed by the display device 100, the display device 300, the display device 400, the display device 500, the display device 600, the display device 700 and the display device 900 described above, which will not be repeated here.

In embodiments of the present disclosure, the display method further includes: in response to a first switching command, controlling the first data line to switch from the first transmission mode to the second transmission mode, and controlling the selection signal to switch from the first level to the second level; and in response to the selection signal being at the second level, controlling the second data line to switch from the second transmission mode to the first transmission mode.

In embodiments of the present disclosure, the display method further includes: in response to the first switching command, controlling the first data line to switch from the first transmission mode to the second transmission mode; controlling the selection signal to switch from the first level to the second level after a first duration has elapsed; and in response to the selection signal being at the second level, controlling the second data line to switch from the second transmission mode to the first transmission mode after a second duration has elapsed.

In embodiments of the present disclosure, the display method further includes: in response to the second switching command, controlling the second data line to switch from the first transmission mode to the second transmission mode, and controlling the selection signal to switch from the second level to the first level; and in response to the selection signal being at the first level, controlling the first data line to switch from the second transmission mode to the first transmission mode.

In embodiments of the present disclosure, the display method further includes: in response to the second switching command, controlling the second data line to switch from the first transmission mode to the second transmission mode; controlling the selection signal to switch from the second level to the first level after a first duration has elapsed; and in response to the selection signal being at the first level, controlling the second data line to switch from the second transmission mode to the first transmission mode after a second duration has elapsed.

In embodiments of the present disclosure, the display method further includes: controlling the selection signal to be at the first level after the display panel is powered on; and in response to the first level of the selection signal, driving the display panel to display in the first display mode through the first data line and the first control circuit.

In embodiments of the present disclosure, the display method further includes: transmitting the first data signal at a first rate by using the first data line, and transmitting the second data signal at a second rate by using the second data line, where the first rate is greater than the second rate.

The block diagrams in the accompanying drawings illustrate architectures, functions and operations that may be implemented by systems, methods and computer program products according to various embodiments of the present disclosure. In this regard, each block in the flowcharts or block diagrams may represent a module, a program segment, or a portion of code, which contains one or more executable instructions for implementing specified logical functions. It should also be noted that in some alternative implementations, the functions noted in the blocks may occur in an order different from that noted in the figures. For example, two successively represented blocks may be actually executed substantially in parallel, or may sometimes be executed in the reverse order, depending on the functions involved. It should also be noted that each block in the block diagrams or flowcharts, and combinations of blocks in the block diagrams or flowcharts, may be implemented by a dedicated hardware-based system that performs specified functions or operations, or by a combination of dedicated hardware and computer instructions.

Those skilled in the art may understand that the features described in various embodiments and/or claims of the present disclosure may be combined and/or integrated in various ways, even if such combinations or integrations are not explicitly described in the present disclosure. In particular, the features described in various embodiments and/or claims of the present disclosure may be combined and/or integrated in various ways without departing from the spirit and teachings of the present disclosure. All these combinations and/or integrations fall within the scope of the present disclosure.

Embodiments of the present disclosure have been described above. However, these embodiments are merely for illustrative purposes and are not intended to limit the scope of the present disclosure. Although the embodiments have been described separately above, this does not mean that the measures in the embodiments cannot be used in combination advantageously. The scope of the present disclosure is defined by the appended claims and their equivalents. Those skilled in the art may make various substitutions and modifications without departing from the scope of the present disclosure, and these substitutions and modifications should fall within the scope of the present disclosure.

What is claimed is:

1. A display device, comprising:

a display panel;

a driving circuit;

a first control circuit electrically connected to the driving circuit via a first data line, wherein the first control circuit is configured to, in response to a selection signal from the driving circuit being at a first level, send a first data signal to the driving circuit via the first data line so that the driving circuit drives the display panel to display in a first display mode; and a second control circuit electrically connected to the driving circuit via a second data line, wherein the second control circuit is configured to, in response to the selection signal being at a second level, send a second data signal to the driving circuit via the second data line so that the driving circuit drives the display panel to display in a second display mode;

wherein a display power of the display panel in the first display mode is greater than a display power of the display panel in the second display mode;

wherein the first control circuit is further configured to send a first switching command to the second control circuit and control the first data line to switch from a first transmission mode to a second transmission mode, the first switching command indicates a switch from the first display mode to the second display mode, and a transmission power in the first transmission mode is greater than a transmission power in the second transmission mode; and wherein the second control circuit is further configured to, in response to the first switching command, switch the selection signal from the first level to the second level and control the second data line to switch from the second transmission mode to the first transmission mode.

2. The display device according to claim 1, wherein the second control circuit is further configured to:

in response to the first switching command, switch the selection signal from the first level to the second level after a first duration has elapsed; and in response to the selection signal being at the second level, control the second data line to switch from the second transmission mode to the first transmission mode after a second duration has elapsed.

3. The display device according to claim 1, wherein the first control circuit is further configured to stop sending the first data signal to the driving circuit, in response to the first data line switching from the first transmission mode to the second transmission mode; and wherein the second control circuit is further configured to send the second data signal to the driving circuit via the second data line, in response to the second data line switching from the second transmission mode to the first transmission mode.

4. The display device according to claim 1, wherein the first control circuit is further configured to send the first switching command to the driving circuit via the first data line; and wherein the driving circuit is further configured to, in response to the first switching command, control a first unit to switch from an active state to a sleep state and control a second unit to switch from a sleep state to an active state, the first unit of the driving circuit is configured to process the first data signal, and the second unit of the driving circuit is configured to process the second data signal.

5. The display device according to claim 1, wherein the second control circuit is further configured to send a second switching command to the first control circuit and control the second data line to switch from a first transmission mode to a second transmission mode, the second switching command indicates a switch from the second display mode to the first display mode, and a transmission power in the first transmission mode is greater than a transmission power in the second transmission mode; and wherein the first control circuit is further configured to, in response to the second switching command, switch the selection signal from the second level to the first level and control the first data line to switch from the second transmission mode to the first transmission mode.

6. The display device according to claim 5, wherein the first control circuit is further configured to:

in response to the second switching command, switch the selection signal from the second level to the first level after a first duration has elapsed; and in response to the selection signal being at the first level, control the first data line to switch from the second transmission mode to the first transmission mode after a second duration has elapsed.

7. The display device according to claim 5, wherein the second control circuit is further configured to stop sending the second data signal to the driving circuit, in response to the second data line switching from the first transmission mode to the second transmission mode; and wherein the first control circuit is further configured to send the first data signal to the driving circuit via the first data line, in response to the first data line switching from the second transmission mode to the first transmission mode.

8. The display device according to claim 7, wherein the driving circuit comprises:

a selection pin electrically connected to a first end of the selection signal line and a first end of a pull-down resistor, wherein a second end of the pull-down resistor is electrically connected to a target power supply, and a target power supply voltage of the target power supply is consistent with the first level.

9. The display device according to claim 5, wherein the second control circuit is further configured to send the second switching command to the driving circuit via the second data line; and wherein the driving circuit is further configured to, in response to the second switching command, control a first unit to switch from a sleep state to an active state and control a second unit to switch from an active state to a sleep state, the first unit of the driving circuit is configured to process the first data signal, and the second unit of the driving circuit is configured to process the second data signal.

10. The display device according to claim 1, wherein the selection signal is transmitted from the driving circuit to the first control circuit and the second control circuit via a selection signal line.

11. The display device according to claim 1, further comprising:

a register configured to store the selection signal written by the first control circuit, wherein the selection signal is transmitted from the driving circuit to the first control circuit via a selection signal line, and the second control circuit is configured to read the selection signal from the register.

12. The display device according to claim 1, wherein the first data line is configured to transmit the first data signal at a first rate, the second data line is configured to transmit the second data signal at a second rate, and the first rate is greater than the second rate.

13. The display device according to claim 1, wherein the first control circuit is further configured to, when the display panel is powered on, control the selection signal to be at the first level and communicatively connect with the driving circuit via the first data line.

14. A display method applied to a display device comprising: a display panel; a driving circuit; a first control circuit electrically connected to the driving circuit via a first data line, wherein the first control circuit is configured to, in response to a selection signal from the driving circuit being at a first level, send a first data signal to the driving circuit via the first data line so that the driving circuit drives the display panel to display in a first display mode; and a second control circuit electrically connected to the driving circuit via a second data line, wherein the second control circuit is configured to, in response to the selection signal being at a second level, send a second data signal to the driving circuit via the second data line so that the driving circuit drives the display panel to display in a second display mode; wherein a display power of the display panel in the first display mode is greater than a display power of the display panel in the second display mode, wherein the first control circuit is further configured to send a first switching command to the second control circuit and control the first data line to switch from a first transmission mode to a second transmission mode, the first switching command indicates a switch from the first display mode to the second display mode, and a transmission power in the first transmission mode is greater than a transmission power in the second transmission mode; and wherein the second control circuit is further configured to, in response to the first switching command, switch the selection signal from the first level to the second level and control the second data line to switch from the second transmission mode to the first transmission mode;

wherein the method comprising:

in response to a selection signal being at a first level, controlling the first control circuit to send a first data signal to the display panel via the first data line so as to drive the display panel to display in a first display mode; and in response to the selection signal being at a second level, controlling the second control circuit to send a second data signal to the display panel via the second data line so as to drive the display panel to display in a second display mode.

15. The display method according to claim 14, further comprising:

in response to the first switching command, controlling the first data line to switch from the first transmission mode to the second transmission mode and controlling the selection signal to switch from the first level to the second level; and in response to the selection signal being at the second level, controlling the second data line to switch from the second transmission mode to the first transmission mode.

16. The display method according to claim 14, further comprising:

in response to the first switching command, controlling the first data line to switch from a first transmission mode to a second transmission mode;

controlling the selection signal to switch from the first level to the second level after a first duration has elapsed; and in response to the selection signal being at the second level, controlling the second data line to switch from the second transmission mode to the first transmission mode after a second duration has elapsed.

17. The display method according to claim 14, further comprising:

in response to the second switching command, controlling the second data line to switch from a first transmission mode to a second transmission mode and controlling the selection signal to switch from the second level to the first level; and in response to the selection signal being at the first level, controlling the first data line to switch from the second transmission mode to the first transmission mode.

18. The display method according to claim 14, further comprising:

in response to the second switching command, controlling the second data line to switch from a first transmission mode to a second transmission mode;

controlling the selection signal to switch from the second level to the first level after a first duration has elapsed; and in response to the selection signal being at the first level, controlling the second data line to switch from the second transmission mode to the first transmission mode after a second duration has elapsed.

19. The display method according to claim 14, further comprising:

controlling the selection signal to be at the first level after the display panel is powered on; and in response to the selection signal being at the first level, driving the display panel to display in the first display mode using the first data line and the first control circuit;

wherein the method further comprises transmitting the first data signal at a first rate using the first data line, and transmitting the second data signal at a second rate using the second data line, wherein the first rate is greater than the second rate.

* * * * *